March 17, 1931. W. A. WHATMOUGH ET AL 1,797,113
CARBURETING OF AIR PARTICULARLY FOR INTERNAL COMBUSTION ENGINES
Filed Sept. 11, 1929   3 Sheets-Sheet 1

Inventor,
W. A. Whatmough
W. L. Fisher
Pattison, Wright & Pattison Attys.

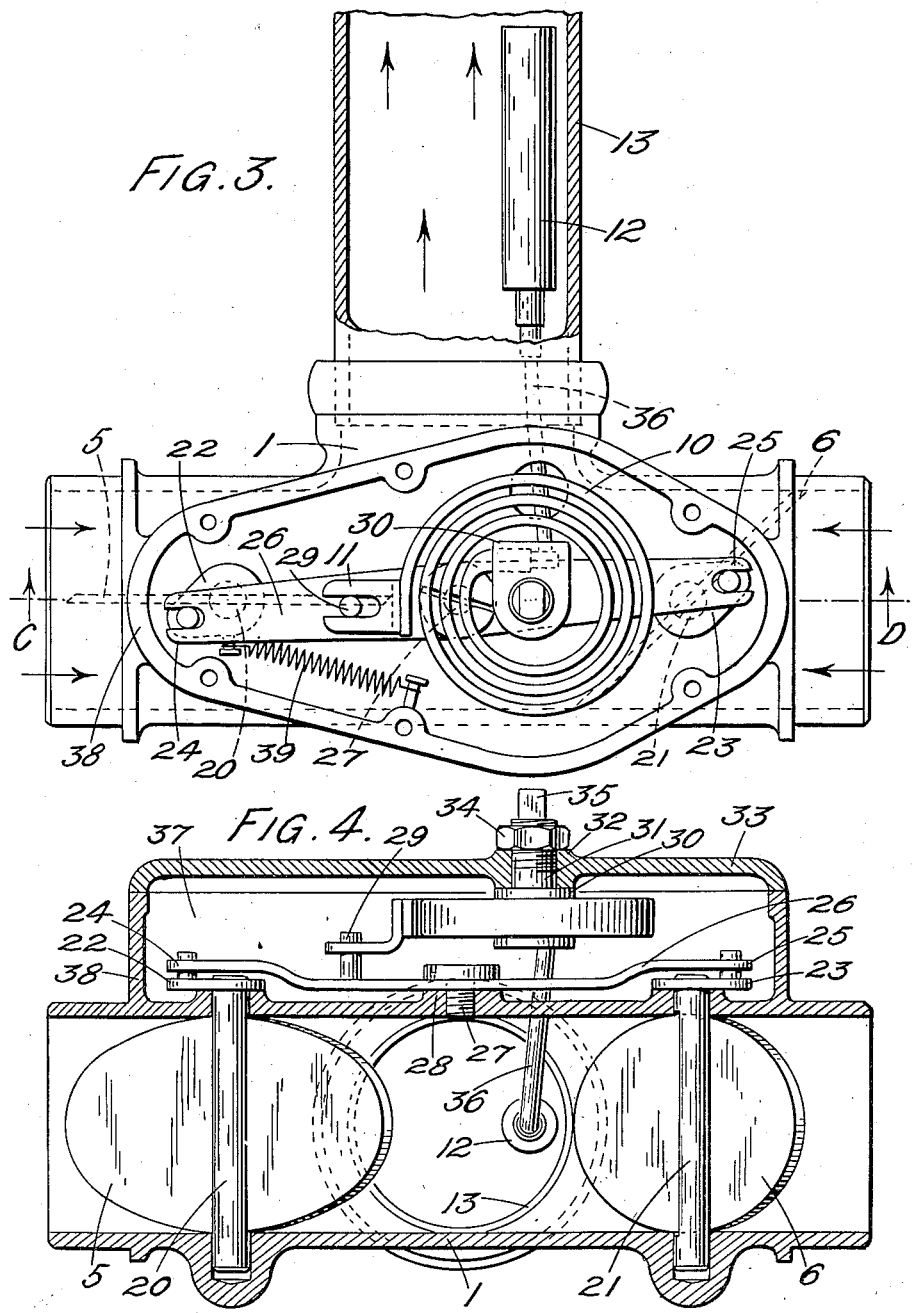

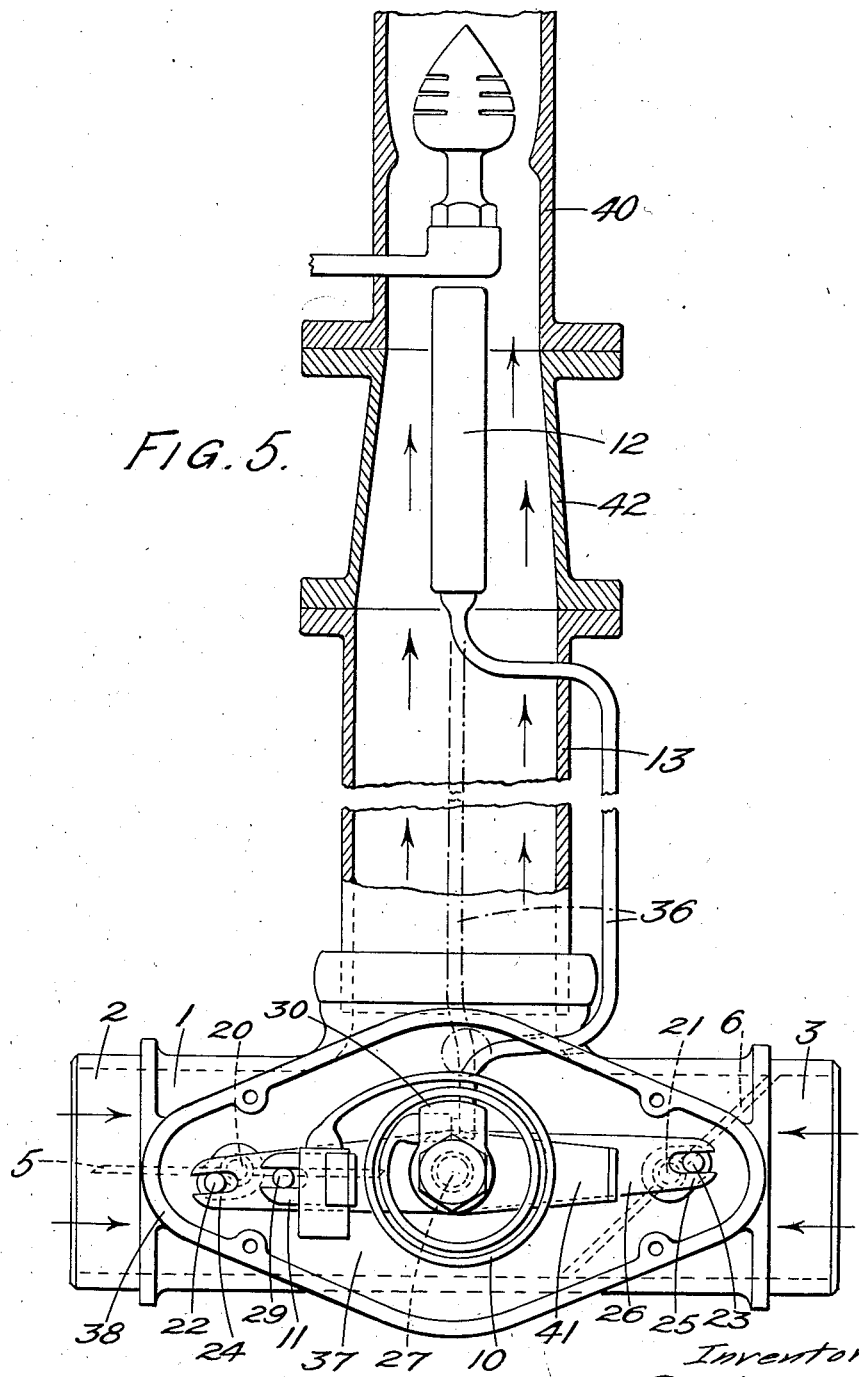

Patented Mar. 17, 1931

1,797,113

UNITED STATES PATENT OFFICE

WILFRED AMBROSE WHATMOUGH, OF NEW BARNET, AND WALTER LAWRENCE FISHER, OF RICHMOND, ENGLAND

CARBURETING OF AIR PARTICULARLY FOR INTERNAL-COMBUSTION ENGINES

Application filed September 11, 1929, Serial No. 391,840, and in Great Britain December 22, 1928.

This invention relates to the carbureting means for internal combustion engines and it has for object improvements by which certain advantages shall be obtained.

The invention relates more particularly to apparatus of the kind in which supplies of hot and cold air are connected to the air inlet of the carburettor and a thermostat device acts to control the passages through which hot and cold air are supplied.

According to the present invention means to supply air to a carburettor comprises a mixing chamber to receive a supply of hot and cold air, a valve or valves to control the proportions of hot and cold air and means to operate said valve or valves to maintain the temperature of the mixture at a predetermined and substantially constant degree or within a predetermined and substantially constant temperature range, comprising a closed vessel containing a fluid disposed in the path of the air mixture or of the fuel and air mixture and having a Bourdon tube communicating therewith with said tube operatively connected to the valve or valves.

A valve may comprise an apertured plate which moves in relation to a second apertured plate and is carried on a cranked spindle to which the Bourdon tube is connected.

Forms of the present invention will now be described with reference to the accompanying drawings wherein:—

Fig. 3 shows a plan partly in section of a second form, Fig. 4 shows a section of the line C—D of Fig. 3 in the direction of the arrows, and Fig. 5 shows a modification of the invention illustrated in Figs. 3 and 4.

Like references refer to like parts of the drawings.

Figure 1:
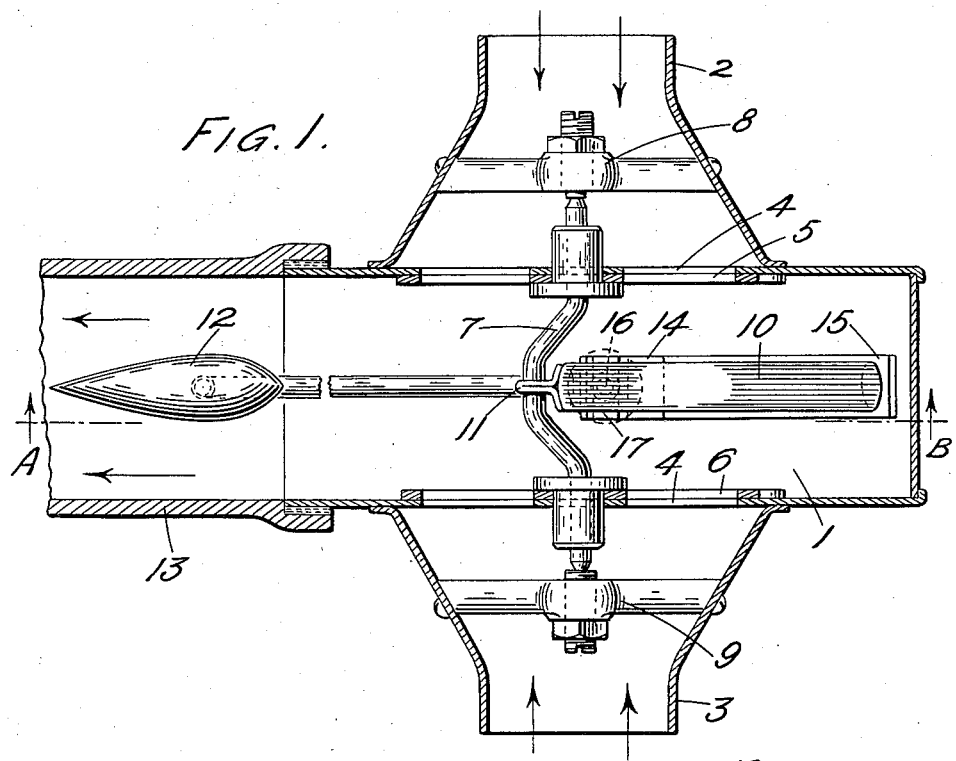
Fig. 1 shows a plan view in section of one form.
Figure 2:
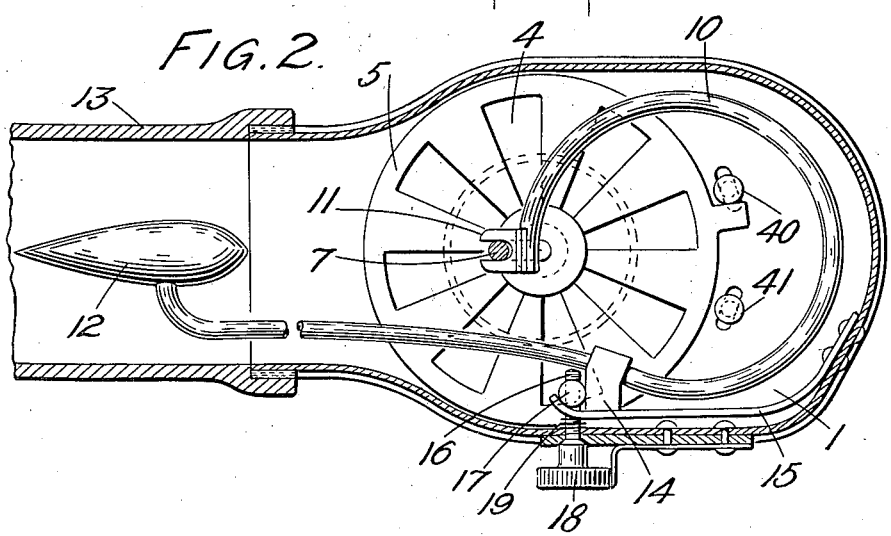
Fig. 2 shows a section on the line A—B of Fig. 1, in the direction of the arrows.

Referring to Figs. 1 and 2, an air mixing chamber 1 has a conduit 2 opening into one side through which hot air is supplied, and a second conduit 3 opening into the opposite side through which cold air is supplied. In the opening of each conduit into the chamber 1 is arranged a fixed and apertured plate 4 and movable and similarly apertured plates 5, 6 are arranged in juxtaposition to said fixed plates. The movable plates are mounted on a cranked spindle 7 carried in bearings 8, 9 supported in the respective conduits 2, 3. The crank is connected to one end of a Bourdon tube 10 by means of a bifurcated member 11 and said tube at its other end communicates with a closed vessel 12 containing a volatile liquid and vapour therefrom or a liquid, such as mercury. Said vessel is preferably of stream line form as shown and is arranged in the conduit 13 connecting the mixing chamber 1 with the carburettor. The Bourdon tube is mounted in the chamber 1 by a strap 14 carried on a member 15 secured at its one end to the inner wall of the chamber 1. A threaded rod 16 passes through the other end of the member 15 beyond the strap 14 and engages a nut 17. The outer end of the threaded member is provided with a milled head 18 and a spring 19 acts between said head and the underside of the member 15. The portion of the conduit 13 in which the vessel 12 is arranged may be considered as a chamber through which the air mixture passes and said chamber is preferably heat insulated. Thus the walls may be lined either inside or outside with heat insulating material or they may be formed of heat insulating material. The effect of extraneous heat as, for example, radiated heat from adjacent hot walls is thereby prevented from affecting the closed vessel 12. 40 and 41 are stops to control the extreme positions of the apertured plates 5 and 6.

In operation the hot and cold air streams enter the mixing chamber 1 through the conduits 2, 3 respectively from opposite directions and produce a turbulent and thorough mixing. The mixed air then flows past the closed vessel 12 which is completely surrounded thereby. The pressure in the vessel 12 and the Bourdon tube 10 varies in accordance with the temperature of the air mixture. For example, should the air be too hot the Bourdon tube will extend and cause the valves 5, 6 to be adjusted to reduce the supply of hot air and increase the supply of cold air. Thus the temperature of the mixed air passing the closed vessel 12 on its way to the carburettor is maintained at a predetermined and substantially constant degree. By adjusting the position of the threaded rod 16 the point at which the valves 5, 6 operate may be adjusted.

Referring now to Figs. 3 and 4. The mixing chamber 1 is constituted by an open-ended conduit to one end of which hot air is supplied and to the other end of which cold air is supplied. The valves 5, 6 controlling the admixture of hot and cold air are, in this case, butterfly valves carried on spindles 20, 21 respectively having bearings in the wall of the conduit 1. At their one ends the spindles 20 and 21 project through the wall 1 and carry cranks 22, 23 respectively. These cranks are engaged by the forked ends 24, 25 of a lever 26 pivoted at its centre on a pin 27 screwed into a boss 28 on the outer wall of the conduit 1. The Bourdon tube 10 is wound into a spiral and at one end carries a bifurcated member 11 which engages a pin 29 carried on the lever 26. At the other end the spiral 10 enters a block 30 having an outwardly projecting pin 31 which passes through a hole in a boss 32, on a cover plate 33. The pin 31 is threaded towards its outer end and is secured by a nut 34. The pin 31 is also shaped at its outer end at 35 so that it may be engaged by a spanner or other tool for adjustment. The closed vessel 12, which may be of stream line form, is connected by a tube 36 passing through the wall of the conduit 1 to the block 30 in which it communicates with the Bourdon tube 10. The Bourdon tube, the lever 26 and the cranks 22, 23 are housed in a chamber 37 formed by a wall 38 extending outwardly from and cast integral with the conduit 1 and said chamber is closed by the cover plate 33. The chamber or conduit 13 may be heat insulated as described with reference to Figs. 1 and 2.

The operation of the apparatus is exactly similar to the operation of the apparatus illustrated in Figs. 1 and 2. 39 is a spring which may be employed if desired to hold the cold air conduit closed until the temperature of the mixed air has reached a desired point. By rotating the pin 31 the point of operation of the valves 5 and 6 by the Bourdon tube 10 may be adjusted.

In Fig. 5 the closed vessel 12 is mounted in the conduit 13 at or near the point of introduction of the air to the carburettor 40 and so that it is completely surrounded by the mixed air stream. In this figure the lever 41 constitutes the means to adjust the point at which the Bourdon tube causes the valves controlling the proportions of hot and cold air to operate. The conduit 13 or the part of said conduit 42 adjacent the carburettor is preferably heat insulated. The tube 36 may pass either inside or outside the conduit 13.

It will be understood that the temperature of the mixture at the point of turbulent mixing need not be the temperature at the point at which the mixed air passes the closed vessel and the system provides means which compensate for any cooling or warming of the mixed air which takes place during the passage to the closed vessel, thereby permitting the placing of the mixing chamber at a distance from said closed vessel: thus the closed vessel may be placed at a point beyond the carburettor.

Any convenient means may be employed for heating the hot air, for example, the air may be passed through a conduit heated by the exhaust of the engine.

If desired the air delivered to the mixing chamber may be passed through filters, preferably of the kind including vanes, and said filters may be built integral with or attached to the walls of the conduits for the hot and cold air thus forming a unitary structure.

What we claim is:—

1. Means to supply air to a carburettor comprising a mixing chamber, hot and cold air inlet ducts for said chamber, a mixed air outlet duct for said chamber, a valve located in each of the inlet ducts, a spindle carrying each valve, a crank on each spindle, a centrally pivoted rocking lever having one end connected to one of said cranks and the other end connected to the other of said cranks, a Bourdon tube connected to the said rocking lever to move it and communicating with a closed vessel containing a fluid which vessel is located in the outlet duct.

2. Means to supply air to a carburettor comprising a mixing chamber, hot and cold air inlet ducts for said chamber, valve means in each of said ducts to control the amounts of hot and cold air supplied to the mixing chamber, and operating means to operate the said valve means comprising a closed vessel containing a fluid and a Bourdon tube communicating with the said closed vessel and operatively connected to the said valve means, the Bourdon tube being in a chamber separated from the chamber in which the closed vessel is located.

3. Means to supply air to a carburettor comprising a mixing chamber, hot and cold air inlet ducts for said chamber arranged oppositely whereby the hot and cold air streams arrive in said chamber from opposite directions and so cause turbulence of the air in the said chamber, a mixed air outlet duct for said chamber approximately at right angles to the two inlet ducts, valve means in each inlet duct to control the amount of hot or cold air respectively supplied to the mixing chamber by that duct, operating means to operate both the said valve means conjointly to maintain the temperature of the mixture in the outlet duct within a predetermined and substantially constant temperature range, the said operating means comprising a closed vessel containing a fluid disposed within the outlet duct, a Bourdon tube communicating with said closed vessel and operatively connected to the said valve means, and means to adjust relatively one end of the Bourdon tube and the said valve means to vary initially the point at which the valve means operate under movement of the Bourdon tube.

4. Means to supply air to a carburettor comprising a mixing chamber, hot and cold air inlet ducts for said chamber, means to control the amounts of hot and cold air supplied to the mixing chamber, and operating means to operate said control means comprising a closed vessel containing a fluid and a Bourdon tube communicating with said closed vessel and operatively connected to said hot and cold air control, the Bourdon tube being in a chamber separated from the chamber in which the closed vessel is located.

5. Means to supply air to a carburettor comprising a mixing chamber, hot and cold air inlet ducts for said chamber, means controlling the amounts of hot and cold air supplied to the mixing chamber, and operating means to operate said control means comprising a closed vessel containing a fluid located substantially between said mixing chamber and the carburettor, a Bourdon tube located in said mixing chamber and a tube connecting said closed vessel and said Bourdon tube operating as set forth.

Dated this 22nd day of August, 1929.

WILFRED AMBROSE WHATMOUGH.
WALTER LAWRENCE FISHER.